Patented Oct. 13, 1936

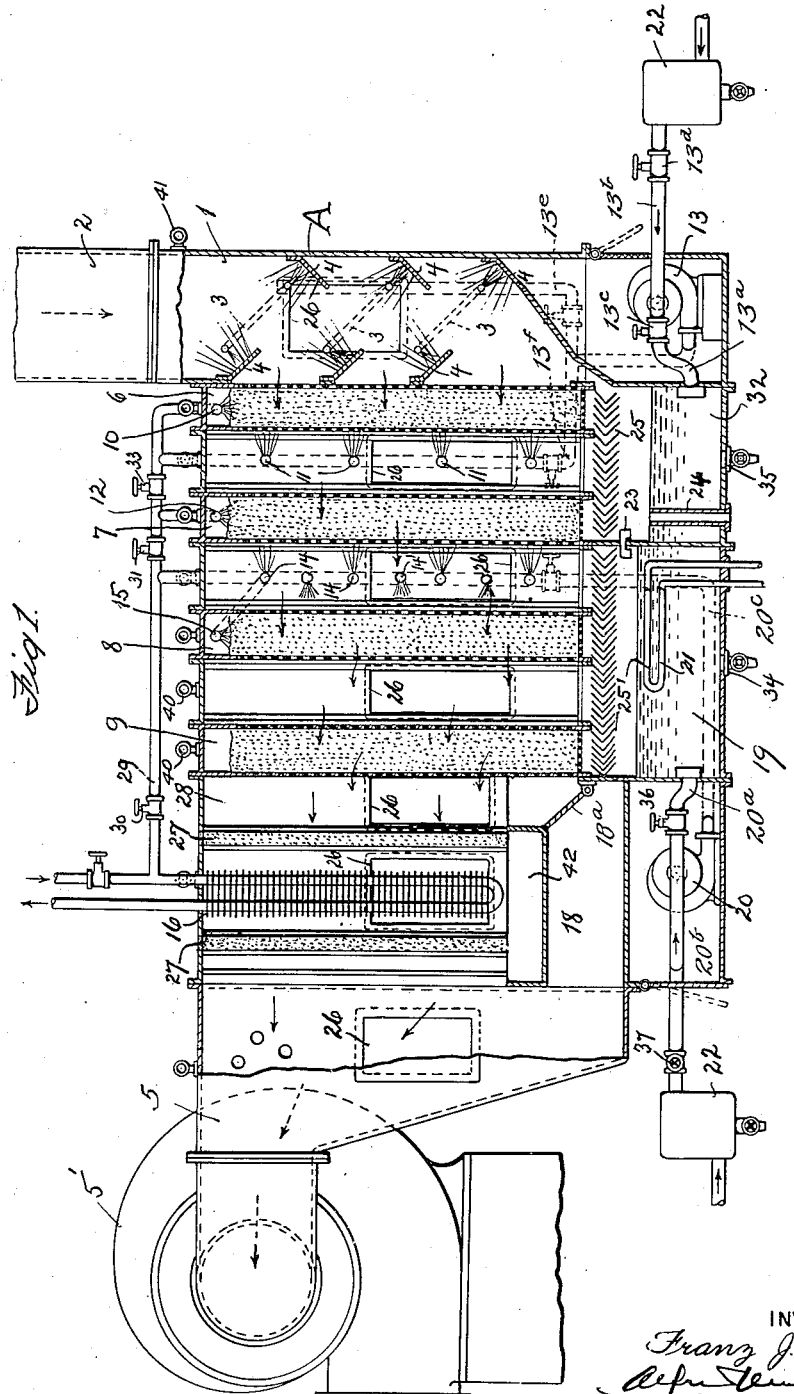

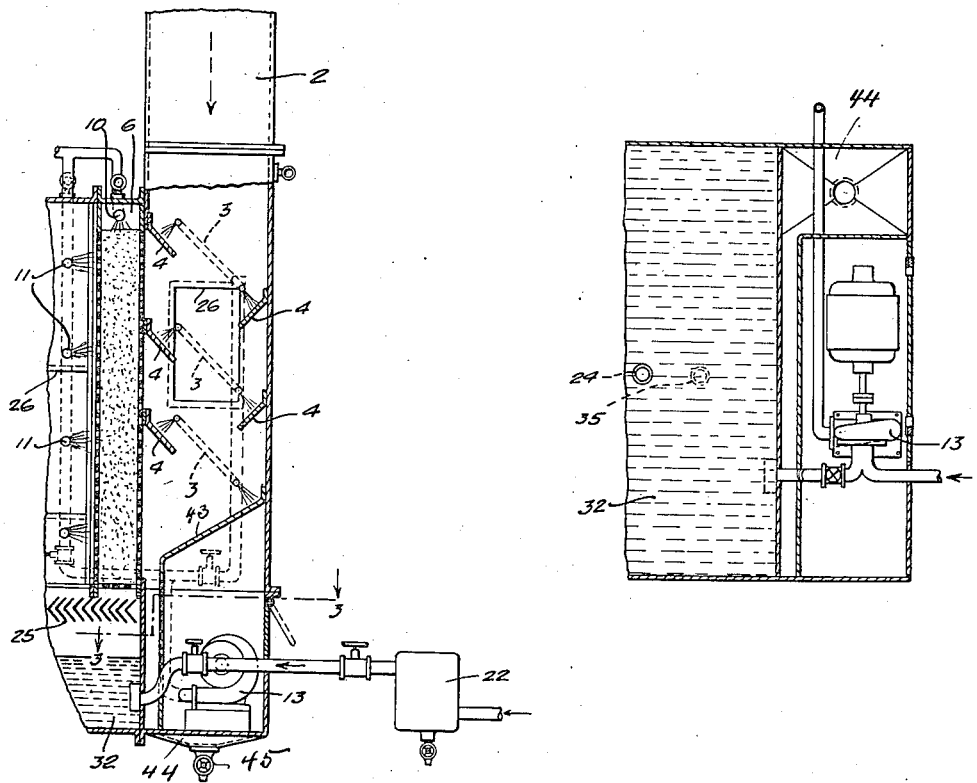

2,057,579

UNITED STATES PATENT OFFICE 2,057,579

APPARATUS FOR PURIFYING AND OTHERWISE TREATING AIR

Franz Josef Kurth, London, England

Application April 4, 1935, Serial No. 14,683
In Great Britain April 4, 1934

16 Claims. (Cl. 183—9)

This invention relates to an improved method of an apparatus for cleaning and otherwise treating air to provide, for example, pure air having a desired temperature and a desired moisture content, and has generally in view to provide a practical and efficient method and apparatus whereby air may be cleaned and furnished at a desired temperature and with a desired moisture content at comparatively low cost.

With the foregoing general purpose in view, the invention consists in the novel method and in an apparatus embodying the novel combination and arrangement of features, and having the novel mode of operation, as will be hereinafter more fully described, illustrated in the accompanying drawings and defined in the appended claims.

In the drawings:—

Figure 1 is a longitudinal section through an apparatus constructed in accordance with one practical embodiment of the invention.

Figure 2 is a fragmentary view similar to Fig. 1 illustrating an alternative embodiment of the apparatus; and Figure 3 is a horizontal section on the line 3—3 of Fig. 2.

Referring to the drawings in detail, A designates, generally, a casing having at one end thereof a chamber 1 to which is connected a conduit 2 for the supply of the air to be treated, and having at its other end a conduit 5 for the delivery of the treated air, while at 5' is designated a fan, shown in the present instance as being connected with the delivery conduit 5, for causing the air to flow through the casing.

Within the casing A is a series of air filters of any suitable type which preferably are vertically or substantially vertically disposed and suitably spaced apart as shown, and which extend from side to side and from top to bottom of the casing. Four of these filters, designated as 6, 7, 8, and 9, are shown in the present instance and each may comprise, for example, a foraminous casing containing a ceramic, metallic or other suitable filtering body, which bodies may be of the same porosity or of progressively decreasing porosity, respectively, toward the outlet conduit 5. The first filter, 6, forms the inner wall of the chamber 1, and since said chamber otherwise is either entirely closed, or is provided at its bottom with a liquid drain opening of only very small area, it follows that substantially all air flowing through the casing is required to pass through each of the filters 6, 7, 8, and 9.

Suitably arranged to discharge into the chamber 1 at spaced points, preferably against baffle plates 4, is a plurality of liquid spraying or atomizing devices 3 which may be supplied with liquid, water for example, from any desired source, thus to maintain a heavy mist or vapor within said chamber for the purpose of washing from the incoming air all relatively heavy particles of foreign matter which may be contained therein. The baffle plates 4 are disposed at opposite sides of the chamber 1 at downward and inward inclinations and the plates at one side of said chamber are disalined, horizontally, from the plates at the opposite side of the chamber. Moreover, the sprays from the devices 3 strike against the upper sides of said plates 4 normal, or substantially normal thereto, thereby producing counter-sprays which are counter to the direction of flow of the air at any given point in its flow through the chamber 1, since the air, in striking any given baffle plate, is deflected toward the next lower baffle plate at the opposite side of the chamber 1 substantially normal thereto and, therefore, substantially normal to the related counter-spray.

Other liquid spraying devices 10, 12, and 15 are arranged to direct sprays of liquid over the tops of the first three filters, 6, 7, and 8, respectively, while within the space between the first and the second filters 6 and 7 is a plurality of spraying devices 11 arranged to direct sprays of liquid laterally against the first filter 6. Similarly within the space between the second and the third filters 7 and 8 is a plurality of spraying devices 14 which are arranged to direct sprays laterally against said second and third filters. All parts of the filters 7, 8, and 9 thus are maintained thoroughly wet and at the same time there is a constant downward flow of liquid through said filters to cleanse the same.

Below the first two filters 6 and 7 and the space therebetween, which space is open at its bottom, is a sump or tank 32 into which gravitates the liquid delivered to said filters 6 and 7 by the spraying devices 10, 11, and 12, while below the second two filters and the space therebetween, as well as below the space between the second and third filters, which latter spaces also are open at their bottoms, is a sump or tank 19, separate from the sump or tank 32, into which gravitates the liquid delivered to the filters 7 and 8 by the spraying devices 14 and 15.

In the Fig. 1 embodiment of the invention the chamber 1 communicates at its bottom through a narrow opening with the sump or tank 32 so that the liquid supplied by the spraying devices 3 also collects in said sump or tank 32. With this arrangement a small volume of the air to be treated may reach the second filter 7 without passing through the first filter 6, but any such volume of air is quite negligible. However, it is not essential that liquid supplied to the chamber 1 shall be discharged into the sump or tank 32, for as illustrated in Figs. 2 and 3 said sump or tank may be closed with respect to the chamber 1 and the latter may have an individual sump 44 and drain means 45 therefor, in which event all air supplied to said chamber will, of course, be required to pass through the filter 6 in its flow through the casing.

At 13 is designated a pump which may conveniently be mounted with its driving motor in a compartment below the chamber 1, and which has leading thereto two liquid supply pipes 13ª, 13ᵇ, the former of which is connected to the sump or tank 32 and the latter of which is connected with any suitable source of liquid supply. For example, in case the apparatus is installed in a ship, sea water may be the source of supply with which the pipe 13ᵇ is connected, while on the other hand, said pipe 13ᵇ may be connected to a water main in the event the apparatus is installed in a city or town. In the pipes 13ª, 13ᵇ are valves 13ᶜ, 13ᵈ, respectively, whereby the water or other liquid pumped by the pump 13 may be taken either entirely from the sump or tank 32 or from the source of supply with which the pipe 13ᵇ is connected, or whereby some of the liquid may be taken from said sump or tank and some from the other source of supply. From the pump 13, pipes 13ᵉ, 13ᶠ lead to the spraying devices 3 and 11, respectively.

At 20 is designated a second pump which may also conveniently be mounted with its driving motor in a compartment within the casing A and which has leading thereto two liquid supply pipes 20ª, 20ᵇ, the former of which is connected to the sump or tank 19 and the latter of which is connected to any suitable source of liquid supply. In the pipes 20ª, 20ᵇ are valves 36, 37, respectively, whereby the water or other liquid pumped by the pump 20 may be taken either entirely or in part from the sump or tank 19 or from the source of supply with which the pipe 20ᵇ is connected. From the pump 20 a pipe 20ᶜ leads to the spraying devices 14 and 15 and also to a pipe 29 with which is connected the pipe 13ᶠ and the spraying devices 10 and 12. In said pipe 29 between the pipe 20ᶜ and the spraying devices 12 is a valve 31 which is normally closed so that the water or other liquid pumped by the pump 13 is delivered only to the spraying devices 3, 10, 11, and 12, and the water or other liquid pumped by the pump 20 is delivered only to the spraying devices 14 and 15. If desired, a second valve, 33, may be provided in the pipe 29 between the pipe 13ᶠ and the spraying devices 12 so that these latter spraying devices may optionally be supplied with water or other liquid either from the pipe 13ᶠ or the pipe 20ᶜ.

Between the last filter 9 and the air outlet conduit 5 is an air heating and drying device which may comprise, for example, a steam radiator or coil 16 with which is connected the pipe 29, there being in said pipe 29 between said heating device and the pipe 20ᶜ a valve 30 which is normally closed so that under ordinary operating conditions of the apparatus steam is prevented from flowing to the various spraying devices. When, however, operation of the pumps 13 and 20 is stopped and the valve 30 is opened, and by opening the valves 31 and 33, steam may be supplied to the various spraying devices for the purpose of steam cleaning the filters 6, 7, and 8. Alternatively, instead of the device 16 being used to heat or dry the air, a refrigrant may be circulated therethrough for the purpose of further cooling the air.

To either or both sides of the heating device 16, or at any other suitable point or points, may be arranged an absorbent filter or filters 27 or other means of extracting poisonous or other undesirable gaseous admixtures from the air, while in a chamber 28 between the heating device and the filter 9, or at any other suitable point or points, oxygen or other air treating gases or deodorizing or scenting agents may be introduced into the air following its flow through the cleaning filters.

Below the heating device 16 is a sump 42 to collect any water which may be given up by the air in its flow through this part of the apparatus, or to receive any poisonous gas extracting liquid with which the filters 27 may be supplied and which may drip from said filters, while below said sump is a passageway 18 which provides communication between the chamber 28 and the outlet conduit 5 under the control of a suitable valve 18ª. If said valve is closed the air is required to pass through or over the heating device 16 and through the filter or filters 27 and to be subjected to the actions thereof, whereas, if said valve is opened, part of the air may be by-passed around the heating device and the filters 27. Therefore, depending upon the particular conditions of use of the apparatus, the heating edvice 16 and the filters 27 may or may not be used as desired.

In the normal operation of the apparatus and assuming the use of water as the liquid supplied to the different spraying devices, the air to be treated is caused to flow through the casing, and the spraying devices 3, 10, 11, and 12 are supplied with water from the sump or tank 32, whereby such water is repeatedly used, although some water from the source with which the pipe 13ᵇ is connected may be supplied to said spraying devices either continuously or periodically. At the same time, the spraying devices 14 and 15 are supplied with water from the sump or tank 19 and this water also is repeatedly used, although some water from the source with which the pipe 20ᵇ is connected may be supplied to said spraying devices 14 and 15 either continuously or periodically as in the case of the water supplied to the first mentioned spraying devices. In any event, a heavy mist is produced in the chamber 1 and thereby the air passing through said chamber has washed therefrom any relatively heavy particles of foreign matter which may be contained therein, such particles being carried by the water into the sump or tank 32 and settling in the bottom thereof. The water laden air at reduced temperature then passes successively through the filters 6, 7 and 8 and through the water mists in the spaces between said filters and thereby is further washed and cooled and has the finer particles of foreign matter removed therefrom. By the time the air has passed through the last wet filter 8 all foreign matter has been removed therefrom. In its passage through the filter 9 excess humidity is removed therefrom and if it then is found to be in desired condition for use the valve 18ª may be opened to permit its direct flow to the outlet conduit 5 for distribution where desired. On the other hand, if it is desired to dry the air, or to pass it through the filters 27, after it has passed through the filter 9, the valve 18ª simply is closed.

Since by far major cleaning of the air is effected in the chamber I and by the first and second filters 6 and 7, the use of the separate sumps or tanks 32 and 19 and the separate pumps 13 and 20 provides for the use of only a minimum amount of water to accomplish cleaning of the air and furnishing of the same at a desired temperature, thus rendering the apparatus very economical in operation. This is apparent from the fact that very little residue collects in the sump or tank 19 whereby the water supplied therefrom to the spraying devices 14 and 15 may be used over and over again, since said water always is practically clean. Moreover, the water in the tank or sump 19 may be artificially cooled as by means indicated generally as 21, and may be maintained cool economically because of the comparatively small amount of water involved, while on the other hand, further economy in water consumption is obtained due to repeatedly using the water supplied to the spraying devices 3, 10, 11, and 12 and only taking a relatively small amount of water from the source with which the pipe 13ᵇ is connected either continuously or periodically. This is particularly important in installations where the source with which the pipe 13ᵇ is connected is a city or town water main or the like. On the other hand, in ship installations, the drain 35 from the sump or tank 32 may remain open and the water supplied to the spraying devices 3, 10, 11, and 12 may be taken from the sea. In either event, the temperature of the air is initially lowered materially prior to its passage through the space between the second and the third filters and through the third filter, and thereby the means for artificially cooling the water supplied to the spraying devices 14 and 15 is further relieved of load, thus again contributing to the economical operation of the apparatus.

Preferably the sump or tank 32 is provided with an overflow pipe 24, and preferably, too, an overflow pipe 23 connects the sump or tank 19 with the sump or tank 32 so that water cannot rise above predetermined levels in said sumps or tanks. Moreover, baffle plates 25, 25' preferably are provided at the tops of the sumps or tanks 32, 19, respectively, to prevent splashing of the water against the filters in installations where the apparatus is subject to rolling or like movements, as, for example, on ships. Also, windows 26 preferably are provided in the sides of the casing A at suitable points whereby the apparatus may be inspected when desired without stopping its operation; filters 22 preferably are provided in the pipes 13ᵇ, 20ᵇ, and a valve or plug 34 is provided in the bottom of the sump or tank 19 whereby the same may be drained and cleaned. Furthermore, a feature of the invention resides in preferably forming the casing A in sections as shown to facilitate transportation and installation of the apparatus, especially in places, as on ships, where it would be impossible to move the completely assembled apparatus through narrow corridors and the like. If the casing is formed in sections, the individual sections may be provided with eyes 40 to facilitate raising and lowering of the sections and otherwise moving them into or from assembled relationship.

Reverting to the Figs. 2 and 3 embodiment of the invention wherein the chamber I is not in communication at its bottom with the sump or tank 32, it is pointed out, as aforesaid that major cleaning of the air occurs in the chamber I and that the amount of water supplied to this chamber through the spraying devices 3 under normal operating conditions of the apparatus is only about twenty to twenty-five percent of the volume of water supplied to the spraying devices 10, 11, and 12. It is more economical, therefore, to permit the water delivered to the chamber I to run waste and to recirculate the comparatively clean water from the sump or tank 32 according to the Figs. 2 and 3 embodiment of the invention than it is to continuously or periodically replenish the water in the sump or tank 32 in cases where the chamber I opens at its bottom into the sump or tank 32, because more fresh water is required in the latter case to maintain the water in the sump or tank 32 clean than is required to supply only the spraying devices 3.

While the invention in its mechanical aspects has been described in detail with reference to the accompanying drawings, it is to be understood that the same is not restricted to embodiment in any particular apparatus but that it may be embodied in various different constructions within its spirit and scope as defined in the appended claims.

I claim:

1. Air treating apparatus comprising a casing, air inlet and outlet means at the ends of said casing, respectively, means for causing a flow of air through said casing, a chamber at the air inlet end of said casing, a series of substantially vertically disposed spaced apart air filtering elements within said casing between said chamber and said air outlet means, means for supplying liquid in atomized form to said chamber, baffle means within said chamber against which the liquid is sprayed and which serve to deflect the air so that it takes a tortuous path through said chamber, and means for directing liquid sprays over certain of said filtering elements.

2. Air treating apparatus comprising a casing, air inlet and outlet means at the ends of said casing, respectively, means for causing a flow of air through said casing, a series of substantially vertically disposed air filtering elements within said casing between said air inlet and outlet means, separate liquid tanks below and individual to certain of said filtering elements, and means for circulating liquid from said tanks over the filtering elements related thereto.

3. Apparatus as set forth in claim 2 including means for changing the temperature of the liquid in one of said tanks.

4. Air treating apparatus comprising a casing, air inlet and outlet means at the ends of said casing, respectively, means for causing a flow of air through said casing, a chamber at the air inlet end of said casing, a series of substantially vertically disposed spaced apart air filtering elements within said casing between said chamber and said air outlet means, separate liquid tanks below and individual to certain of said filtering elements, a source of liquid supply, liquid spray devices in said chamber, other devices arranged to spray one of said filtering elements, a pump having a supply connection with one of said tanks and a separate supply connection with a source of liquid supply, and connections between said pump and said liquid spray devices.

5. Air heating apparatus comprising a casing, air inlet and outlet means at the ends of said casing, respectively, means for causing a flow of air through said casing, a filtering element within said casing between said air inlet and outlet means, a liquid tank arranged to receive liquid supplied to and flowing from said filtering element, a source of liquid supply, and means for taking liquid partly from said tank and partly from said source and delivering it to said filtering element.

6. Air treating apparatus comprising a casing, air inlet and outlet means at the ends of said casing, respectively, means for causing a flow of air through said casing, a chamber at the air inlet end of said casing, liquid atomizing means in said chamber, an air filtering and cooling element in said casing between said chamber and the air outlet means, spray means to direct liquid over said filtering element, a tank disposed to receive liquid delivered to and flowing from said filtering element, a source of liquid supply, and means for taking liquid partly from said tank and partly from said source and delivering it to said atomizing means and said spray means.

7. Apparatus as set forth in claim 6 in which the chamber is constructed and arranged to discharge liquid supplied thereto into the tank.

8. Apparatus as set forth in claim 6 in which communication is denied between the chamber and the tank.

9. Apparatus as set forth in claim 6 including an additional filtering element within the casing, a tank individual to and in liquid receiving relationship to liquid delivered to the latter filtering element, and means for circulating liquid from said last mentioned tank over said last filtering element.

10. Apparatus as set forth in claim 6 including an additional filtering element within the casing, a tank individual to and in liquid receiving relationship to liquid delivered to the latter filtering element, means for changing the temperature of the liquid in the last mentioned tank, and means for circulating liquid from said last mentioned tank over the last mentioned filtering element.

11. Air treating apparatus comprising an air pre-cleaning chamber having an air inlet, a filter element forming one side of said chamber, means for producing a flow of air through said chamber and through said filtering element, baffle means within said chamber to cause the air to take a tortuous path therethrough and means for directing liquid against said baffle means to produce liquid counter-sprays flowing counter to the direction of the air, thereby to thoroughly pre-clean the air prior to its passage from the chamber through said filtering element.

12. Air treating apparatus comprising a casing, a plurality of vertically disposed spaced apart filtering elements within said casing, a chamber at one end of said casing, the inner side of said chamber being constituted by the adjacent filtering element, a series of baffle plates within said chamber extending downwardly and outwardly from said filtering element, a second series of baffle plates within said chamber extending downwardly and inwardly from the outer side thereof and staggered with respect to the baffles of the first mentioned series, means for producing a flow of air downwardly through said chamber and through said filtering elements, and means for directing liquid sprays against the upper sides of said baffle plates substantially perpendicularly thereto.

13. Air treating apparatus as set forth in claim 12 including means for directing filter cleaning sprays of liquid against certain of the filtering elements counter to the direction of flow of the air therethrough.

14. Air treating apparatus as set forth in claim 12 including separate liquid reservoirs individual to certain of the filtering elements, and means for circulating liquid from the separate reservoirs through certain of the filtering elements.

15. In air treating apparatus, means for cleaning the air comprising a chamber through which the air flows, baffle plates extending inwardly from opposite sides of said chamber, the baffle plates at each side of said chamber being disalined transversely of said chamber from the baffle plates at the opposite side thereof, each baffle plate at each side of said chamber being inclined toward the next innermost baffle plate at the opposite side of the chamber so that the air in passing through said chamber is deflected by said baffle plates from side to side of said chamber, and means directing a spray of air washing liquid against each baffle plate substantially normal thereto to produce a counter-spray substantially normal to the flow of the air as it approaches each baffle plate.

16. In air treating apparatus, a lateral series of vertically disposed, laterally spaced apart air filtering elements, means for the circulation of air substantially horizontally through said filtering elements, means for directing sprays of cleaning liquid downwardly over certain of said filtering elements, means for directing sprays of cleaning liquid against certain of said filtering elements counter to the direction of flow of the air, and means for directing other sprays of cleaning liquid against certain of said filtering elements in the same general direction as the direction of flow of the air.

FRANZ J. KURTH.